United States Patent
Creed et al.

(10) Patent No.: US 11,556,391 B2
(45) Date of Patent: Jan. 17, 2023

(54) CPU UTILIZATION FOR SERVICE LEVEL I/O SCHEDULING

(71) Applicant: EMC IP Holding Company LLC, Hopkinton, MA (US)

(72) Inventors: John Creed, Innishannon (IE); Owen Martin, Hopedale, MA (US); Andrew Chanler, Berlin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 215 days.

(21) Appl. No.: 16/658,783

(22) Filed: Oct. 21, 2019

(65) Prior Publication Data

US 2021/0117240 A1    Apr. 22, 2021

(51) Int. Cl.
*G06F 9/50* (2006.01)
*G06F 3/06* (2006.01)

(52) U.S. Cl.
CPC ............ *G06F 9/5066* (2013.01); *G06F 3/061* (2013.01); *G06F 9/5011* (2013.01); *G06F 9/5077* (2013.01)

(58) Field of Classification Search
CPC . G06F 9/50–5077; G06F 3/0601–0608; G06F 3/061–0613; G06F 3/0628–0634; G06F 2003/0697
See application file for complete search history.

(56) References Cited

U.S. PATENT DOCUMENTS

| | | | | |
|---|---|---|---|---|
| 8,082,330 B1 * | 12/2011 | Castelli | ................. | G06F 9/5016 |
| | | | | 709/220 |
| 8,117,235 B1 * | 2/2012 | Barta | ...................... | G06F 3/061 |
| | | | | 707/802 |
| 9,965,218 B1 * | 5/2018 | Martin | .................. | G06F 3/0631 |
| 10,318,346 B1 * | 6/2019 | Harizopoulos | ......... | G06F 3/061 |
| 2003/0061264 A1 * | 3/2003 | Benhase | ................ | G06F 9/505 |
| | | | | 718/105 |
| 2006/0095686 A1 * | 5/2006 | Miller | ................... | G06F 3/0659 |
| | | | | 711/151 |
| 2010/0169570 A1 * | 7/2010 | Mesnier | ................ | G06F 3/0685 |
| | | | | 711/E12.019 |
| 2012/0036512 A1 * | 2/2012 | Chung | .................. | G06F 9/4881 |
| | | | | 718/103 |
| 2013/0339635 A1 * | 12/2013 | Amit | ....................... | G06F 3/067 |
| | | | | 711/E12.001 |
| 2014/0181455 A1 * | 6/2014 | Wang | .................... | G06F 3/0653 |
| | | | | 711/171 |

(Continued)

OTHER PUBLICATIONS

Reinforcement Learning-Assisted Garbage Collection to Mitigate Long-Tail Latency in SSD Wonkyung Kang, Dongkun Shin, Sungjoo Yoo, (Year: 2017).*

(Continued)

*Primary Examiner* — Emerson C Puente
*Assistant Examiner* — Paul V Mills
(74) *Attorney, Agent, or Firm* — Krishnendu Gupta; Nikhil Patel (57) ABSTRACT

One or more aspects of the present disclosure relate to service level input/output scheduling to control central processing unit (CPU) utilization. Input/output (I/O) operations are processed with one or more of a first CPU pool and a second CPU pool of two or more CPU pools. The second CPU pool processes I/O operations that are determined to stall any of the CPU cores.

18 Claims, 6 Drawing Sheets

(56) References Cited

U.S. PATENT DOCUMENTS

| | | | |
|---|---|---|---|
| 2014/0281050 A1* | 9/2014 | Vogan | G06F 3/0659 |
| | | | 710/14 |
| 2015/0220463 A1* | 8/2015 | Fluman | G06F 3/061 |
| | | | 711/158 |
| 2017/0177221 A1* | 6/2017 | Trehan | H04L 67/322 |
| 2019/0065257 A1* | 2/2019 | Davila | G06F 9/505 |
| 2019/0129876 A1* | 5/2019 | Trika | G06F 16/2246 |

OTHER PUBLICATIONS

The Inherent Cost of Remembering Consistently Nachshon Cohen, Rachid Guerraoui, Igor Zablotchi (Year: 2018).*

I/O Scheduling with Mapping Cache Awareness for Flash Based Storage Systems Cheng Ji, Chao Wu, Li-Pin Chang, Liang Shi, and Chun Jason Xue (Year: 2016).*

Workload Characteristics and Resource Aware Hadoop Scheduler Divya M., Annappa B (Year: 2015).*

Parallelism-Aware Batch Scheduling: Paving the Way to High-Performance and Fair Memory Controllers Onur Mutlu and Thomas Moscibroda (Year: 2008).*

Differentiated Storage Services Michael Mesnier, Feng Chen, Tian Luo, and Jason B. Akers (Year: 2011).*

PriorityMeister: Tail Latency QoS for Shared Networked Storage Timothy Zhu, Alexey Tumanov, Michael A. Kozuch, Mor Harchol-Balter, and Gregory Ganger (Year: 2014).*

Stall-Time Fair Memory Access Scheduling for Chip Multiprocessors Onur Mutlu Thomas Moscibroda (Year: 2007).*

* cited by examiner

CPU UTILIZATION FOR SERVICE LEVEL I/O SCHEDULING

BACKGROUND

Memory management is a form of resource management applied to computer memory. Memory management can be used to provide ways to dynamically allocate portions of memory to programs at their request, and free it for reuse when no longer needed. Enabling more efficient memory management can be important to computer systems where more than a single process might be underway at any time.

SUMMARY

One or more aspects of the present disclosure relate to service level input/output scheduling to control central processing unit (CPU) utilization. Input/output (I/O) operations are processed with one or more of a first CPU pool and a second CPU pool of two or more CPU pools. The second CPU pool processes I/O operations that are determined to stall any of the CPU cores.

In embodiments, a plurality of CPU (central processing unit) cores can be divided into two or more CPU pools.

In embodiments, the I/O operations that stall any of the CPU cores can be determined based on memory allocation associated with each I/O operation.

In embodiments, identifying a service level (SL) associated with each I/O operation can be identified. Each SL can indicate the memory allocation associated with each I/O operation.

In embodiments, each of the first and second CPU pools can be assigned to process I/O operations based the SL associated with each I/O operation. A set of the SLs can be determined to stall any of the CPU cores.

In embodiments, I/O operations corresponding to a first set of SLs with the first CPU pool can be processed. I/O operations corresponding to a second set of SLs with the second CPU pool can also be processed. The second set of SLs can be determined to stall any of the CPU cores.

In embodiments, CPU cores can be allocated into each of the two or more CPU pools based one on or more of current and historical I/O workloads. Allocating the CPU cores into each of the two or more CPU pools can occur over an allocation period.

In embodiments, the allocation period can be dynamically adjusted based on I/O workload patterns.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Data storage systems include one or more hardware and/or software elements to capture and retain digital data on storage media. For example, the systems include one or more central processing units (CPUs) that manipulate data by performing computations based on one or more input/output (I/O) operations (e.g., read/writes) received from at least one host device. Some CPUs can be multi-core CPUs that include two or more processing units (i.e., cores), each of which can execute a CPU instruction to process I/O operations in parallel.

Depending on an I/O workload (e.g., amount and/or type of I/O operations received by a storage system in a period), processing of some of the I/O operations by the one or more CPU cores may need to be stalled. For example, I/O operations may need to wait for the one or more CPU cores to complete execution of a previously received I/O operation. Stalling of I/O operations represents an inefficient use of CPU resources.

The following describes some CPU stall examples, but there can be additional types of CPU stall scenarios and a skilled artisan understands that embodiments described herein can be used to address any stall scenario.

One type of example stall can occur at a CPU-to-onboard memory communication level. This type of stall can result from wait periods required for inter CPU socket link communication. A second example type of stall is a global memory stall that occurs when a local CPU attempts to access DRAM on a remote system's main board (e.g., a remote blade). In such scenarios, communications between the local CPU and the remote blade may traverse a fabric communication path such as InfiniBand or another communication medium. As such, a CPU core may need to wait for the communication to occur and thus, processing at the core becomes stalled. Another type of example stall occurs when a CPU core attempts to access memory objects which have been paged out to a storage class memory (SCM) drive or Flash drive. Memory objects may need to be decompressed before being brought into DRAM of the CPU core. If a memory object needs to be decompressed, the CPU core may have to wait for the decompression to complete thereby stalling processing at the core. Additional example stalls can occur with respect to data requests requiring lower tiered memory (e.g., having higher latencies) of a storage device's memory hierarchy as further described herein.

Embodiments of the present disclosure optimize overall CPU resource utilization and provide a means by which CPU resources can be better guaranteed for mission critical applications. An existing memory hierarchy of a storage system can be used to streamline CPU to memory and/or storage access. The streamlining can improve CPU utilization and efficiency for I/O operations such as high service level I/O operations. Such improvement in CPU utilization and efficiency can reduce I/O operation response times while maintaining read/write ordering. Accordingly, storage system latency can be reduced and I/O operations per second (IOPS) performance can be increased.

I/O operations received by a data storage system can originate from an application on a host device used by an organization. Each application used by the organization can have different respective business values. As such, data requests (e.g., I/O operations) corresponding to each application can have a traffic priority corresponding to each application's business value. During initialization of a storage array, (e.g., array 12 of FIG. 1), the organization can define quality of service (QoS) (e.g., expected performance envelope) levels for each application and thus, each application's corresponding data requests. The QoS levels can be grouped based on their respective performance envelopes (e.g., range of IOPS). Each group can be assigned a service level (SL) tier having a designation such as diamond, platinum, gold, gilver, or bronze. For example, the diamond SL can correspond to QoS levels with the highest range of IOPS, while the bronze SL can correspond to QoS levels with the lowest range of IOPS. It should be noted that there can be any number of service level tiers can be defined for a storage system, with each tier having any unique designation.

Embodiments described herein can optimize CPU resource utilization based on each I/O operation's corresponding SL tier. For storage systems that include one or more multi-core CPUs, a CPU's cores can be divided into two or more pools and one or more of the pools can be dedicated to process one or more of: I/O operations corresponding to high SL tiers and I/O operations less likely to encounter a stall. Advantageously, storage devices can execute I/O operations at a greater rate and achieve higher throughput.

Embodiments disclosed herein can be applied to any type of CPU. For example, the CPU can be one that uses hyper threading or one that does not use hyper threading. In another example, the CPU can be a single hardware CPU core that is abstracted logically into two separate cores where multiple instructions operate on separate data in parallel. CPU pools described herein can include hyper threaded core pairs, individual hyper-threaded cores from various physical cores, or one or more single core or multiple-core CPUs.

Figure 1:
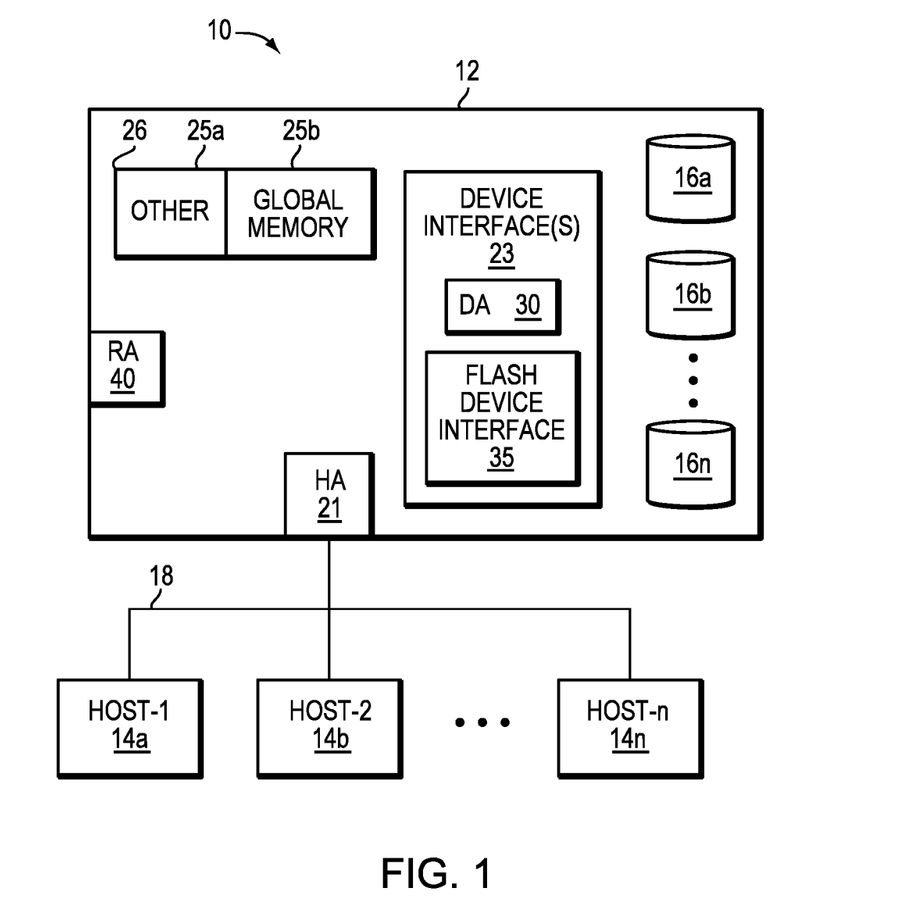
FIG. 1 is a block diagram of an example a storage system in accordance with example embodiments disclosed herein.

Regarding FIG. 1, there is illustrated an example system 10 that can be used to implement embodiments of this disclosure. The system 10 includes a data storage system 12 connected to host systems 14a-14n through communication medium 18. In embodiments, the hosts 14a-14n can access the data storage system 12, for example, to perform input/output (I/O) operations or data requests. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication medium 18.

Each of the hosts 14a-14n and the data storage system 12 can be connected to the communication medium 18 by any one of a variety of connections as may be provided and supported in accordance with the type of communication medium 18. Processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and the data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n or guest machines can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. It should be noted that the techniques described herein are applicable for use with any data storage arrays and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The techniques described herein can be used in an embodiment in which one or more of the devices 16a-16n are flash drives or devices. More generally, the techniques herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays. The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels 18 to the storage systems 12, and the storage systems 12 may also provide data to the host systems 14a-14n also through the channels 18. The host systems 14a-14n do not address the drives or devices 16a-16n of the storage systems directly, but rather access to data can be provided to one or more host systems 14a-n from what the host systems view as a plurality of logical devices or logical volumes (LVs) via, e.g., the HA 21. The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two data storage arrays. The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

Embodiments disclosed herein optimize overall CPU resource utilization in storage devices such as storage system 12. Although described with respect to processing frontend incoming I/O streams, a skilled artisan understands that the embodiments disclosed herein can be applied to any type of processing performed by a CPU.

The hosts 14a-n can issue data requests (e.g., I/O operations) using one or more applications. The system 12 can receive the I/O operations as a stream (e.g., I/O stream) and perform front-end processing via the HA 21. To prevent CPU stalls caused by high I/O workloads, the HA 21 can dedicate one or more pools of CPUs and/or CPU cores to higher storage tiers (e.g., lower latency storage) and to higher priority workloads (e.g., those associated with higher SLs). The HA 21 can also use one or more learning models to predict risks of one or more CPUs and/or CPU cores being stalled. Based on the predicted risk, the HA 21 can perform embodiments described herein.

It should be noted that the HA 21 may exist internal to or external to the data storage system 12. Accordingly, the HA 21 may communicate with the data storage system 12 using any one of a variety of communication connections. In one embodiment, HA 21 may communicate with the data storage system 12 through three different connections, a serial port, a parallel port and using a network interface card, for example, with an Ethernet connection. Using the Ethernet connection, for example, HA 21 may communicate directly with elements within the data storage system 12.

Although embodiments disclosed herein are described as performed by the HA 21, it can be appreciated that they can be performed by any processing element of the data storage system 12.

Figure 2:
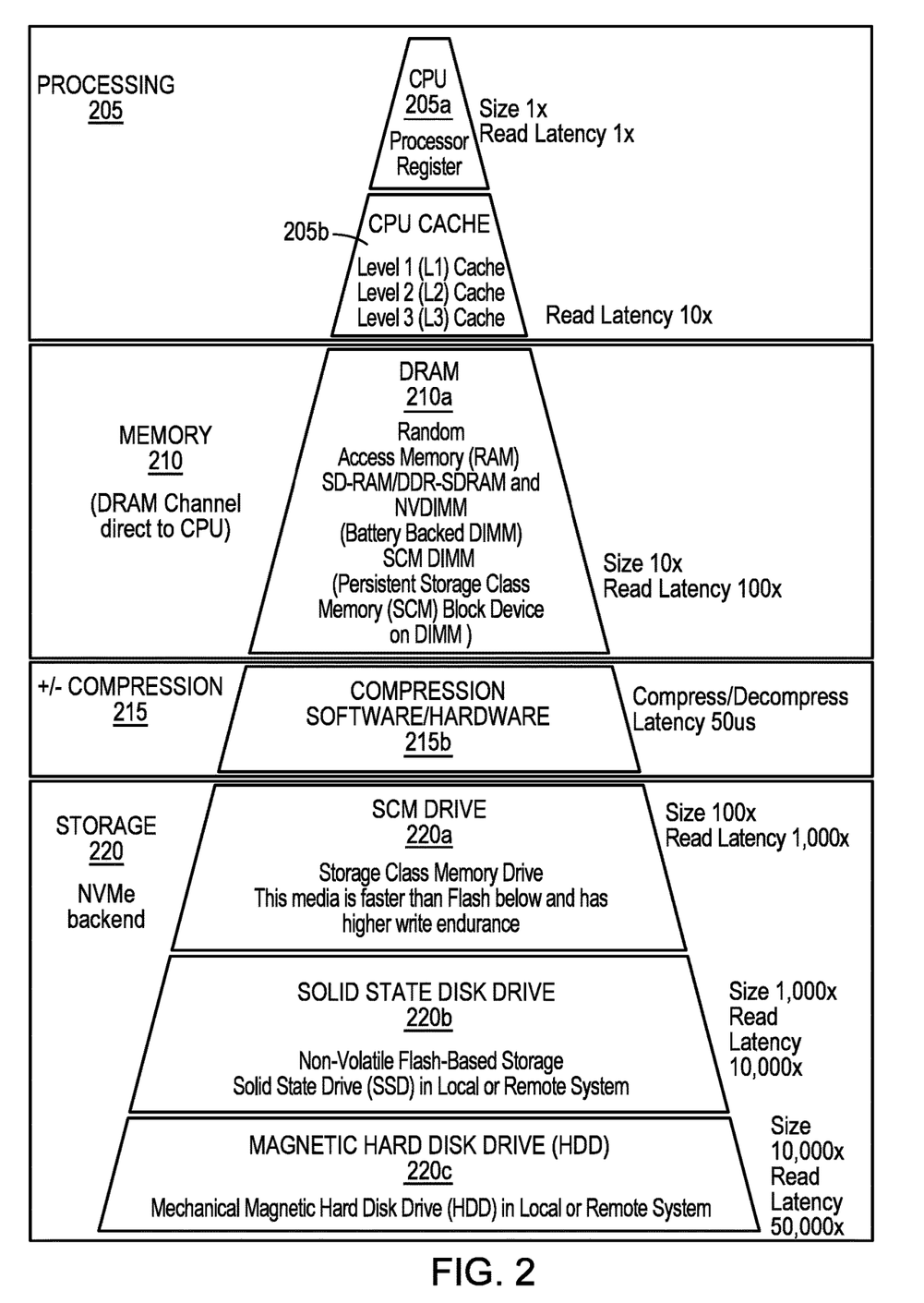
FIG. 2 is a block diagram of a memory hierarchy of a storage system in accordance with example embodiments disclosed herein.

Regarding FIG. 2, the data storage system 12 of FIG. 1 can have a memory architecture similar to memory hierarchy 200 that separates data storage into different levels based on response times (e.g., read/write latencies). The hierarchy 200 includes a processing memory level 205, a direct channel memory level 210, a compression/decompression level 215, and a storage memory level 220. In this example, the processing memory level 205 has the quickest response times, and each subsequent level has slower response times with the storage memory level 220 having the slowest response times of the memory hierarchy 200.

Figure 3:
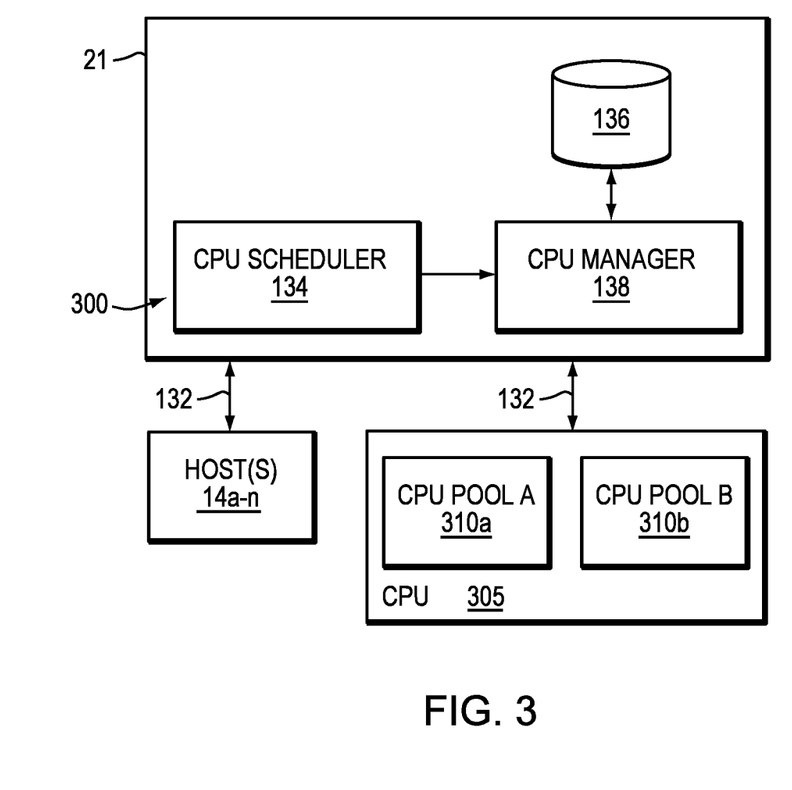
FIG. 3 is a block diagram of a host adapter (HA) included in a storage device in accordance with example embodiments disclosed herein.

The processing memory level 205 is also known as internal memory and is directly accessible by a CPU (e.g., CPU 305 of FIG. 3). The level 205 includes CPU registers 205a and cache 205b. The direct channel memory level 210 is also known as main memory and includes random access memory (RAM) 210 such as dynamic RAM (DRAM), amongst other types of RAM. The memory level 210 is configured to communicate directly with the CPU via, e.g., an I/O processor. The compression/decompression level 215 relates to in-line memory storage 215a that requires compression and/or decompression processing. The storage memory level 220 is also known as auxiliary memory that includes, e.g., storage class memory 220a, solid state disks (SSDs), and magnetic hard disk drives (HDD). The storage memory level 220 is not directly accessible by the CPU. In embodiments, the CPU can access the storage memory level 200 via I/O channels.

Regarding FIG. 1, the HA 21 can anticipate CPU stalls based on an SL associated with an I/O operation. For example, the HA 21 can determine that I/O operations associated with low SLs may require access to memory resources in one of the lower levels (e.g., levels 215 and 220) of the memory hierarchy 200 of FIG. 2. To prevent CPU stalls caused by high I/O workloads, the HA 21 can dedicate one or more pools of CPUs and/or CPU cores to higher storage tiers (e.g., lower latency storage such as levels 201 and 210 of FIG. 2) and to higher priority workloads (e.g., those associated with higher SLs such as Diamond and Platinum). Accordingly, mission critical operations can be processed using CPU cores assigned to the higher storage tiers which are less likely to encounter stalls as they are associated with higher storage tiers. Additional details regarding the HA 21 are described in relation to FIG. 3 below.

Regarding FIG. 3, a host adapter (HA) 21 of a storage system (e.g., storage system 12 of FIG. 1) can include elements 300 (e.g., software and hardware elements) such as CPU Scheduler 134, CPU Manager 138, and memory 136. It should be noted that the HA 21 may be any one of a variety of commercially available processors, such as an Intel-based processor, and the like. Although what is described herein shows details of components including software that may reside in HA 21, all or portions of the illustrated components may also reside elsewhere such as, for example, on interfaces 23, or any processing element of system 12. In other embodiments, the HA 21 can be a parallel processor such as a graphical processing unit (GPU).

As stated herein, stalls can occur, e.g., when a process must wait for resources to be allocated to it, for a specific process to complete or for a communication reply or acknowledgement, and at any level in the memory hierarchy. For example, a process on the HA 21 can become stalled in response to waiting on local memory access, waiting on remote memory access, metadata paged out faults, and compressed metadata to be paged in. Specifically, the wait period is is of a duration that the CPU 305 and/or one of its CPU cores 310*a-b* cannot context-switch, then the process of the HA 21 must wait. Consequently, an instruction stream to one of the CPU cores 310*a-b* becomes idle and stalls. If too many CPUs and/or CPU cores are stalled, mission critical applications may be impacted.

The HA 21, using elements 300, is configured to isolate I/O operations and processes which are determined to likely encounter stalls from those which are least likely to encounter stalls. Based on the determination, the HA 21 is configured to schedule the I/O operations and processes to optimize CPU utilization. For instance, all the processes which are least likely to encounter a stall are run on a first pool of CPU cores (e.g., pool A 310*a*) and those processes which are most likely to encounter a stall are run on a second pool of CPU cores (e.g., pool B 310*b*).

For example, the HA 21 includes a CPU scheduler 134 which monitors one or more I/O streams that include I/O operations (e.g., data requests such as read/write operations) of the data storage system through the connection 132 with hosts 14*a-n*. The CPU scheduler 134 determines an SL of each I/O operation to route each I/O operation to one of the pools 310*a-b*. For example, the CPU scheduler 134 can analyze metadata associated with each I/O operation to make the determination four such routing. The CPU scheduler 134 can make the determination using any known or yet to be known technique. Based on the determination, the CPU scheduler 134 routes each I/O operation to one of the CPU pools A-B 310*a-b* of a CPU 305 via a physical link 133. For instance, the CPU scheduler 134 routes the I/O requests to either CPU pool A 310*a* or CPU pool B 310*b* based on an SL each of the pools 310*a-b* are assigned to process. Thus, the CPU scheduler 134 matches each I/O operation's SL to the pool that is assigned to process such SL operation. In embodiments, the CPU scheduler 305 can route the I/O requests to one of the pools 310*a-b* using, e.g., the technique described by the method 400 of FIG. 4.

In an example, the CPU scheduler 134 can isolate the I/O operations for Diamond and upper tier applications (e.g., platinum) so that they are processed by a single pool of CPU cores principally (e.g., CPU Pool A 310*a*). The scheduler 134 can further isolate I/Os which have the least chance of stalling based on accumulated learning from I/O patterns as performed by, e.g., a CPU manager 138 and as discussed in greater detail below. The CPU scheduler 134 can route such I/Os to also be processed CPU pool A 310*a*. With respect to I/Os that are more likely to encounter a stall, the CPU scheduler 134 can isolate them for processing by a separate pool of CPU cores (e.g., CPU Pool B 310*b*). Using such routing techniques, the HA 21 can increase an overall computational workload throughput for the entire CPU 305. Furthermore, the technique ensures that an actual CPU instruction execution rate for diamond and higher SL tiered processes can be optimized, made more predictable, and increased. As a result, an organization's expected execution rate (e.g., expected QoS) for diamond and higher tiered SL processes can be guaranteed even when the storage system is very busy due to, e.g., heavy I/O workloads.

The HA 21 can include CPU manager 138 to divide cores of the CPU 305 into the pools of CPU cores (e.g., the pools 310*a-b*) to optimizing workload throughput using the CPU scheduler 134. The CPU manager 138, at initialization of the system 12 of FIG. 1, can determine an amount of pools to divide the cores of the CPU 305 into. The number of pools can be determined based on a number of cores and expected ranges of I/O workloads, amongst other parameters.

For example, the CPU manager 138 can determine the number of pools based on types and severities of stalls, a probability of stall occurrences, and minimum acceptable IOPS range for each SL. For instance, the manager 138, for an example workload, can determine that the probability of stall may be 0.05 for 70% of the workload, 0.3 for 20% of the workload and 0.65 for 10% of the workload. In such scenarios, the manager 138 can divide the cores into three (3) pools (e.g., one pool for each of the workload's stall probability subgroups). Further, the manager 138 can allocate cores into each of the pools based on differences in stall severity or impact for each of the workload's subgroups. The manager 138 can determine the differences by determining a location in the memory hierarchy 200 data associated with each of the subgroups are to be fetched from for stored within. Accordingly, the manager 138 can allocate cores into each of the pools by predicting stall impacts for each of the subgroups.

In other embodiments, the manager 138 may divide the cores into two pools (e.g., one for high priority traffic (high SLs) and one for low priority traffic (low SLs)). The manager 138 can also divide the cores into pools to correspond to an amount of SL designations (e.g., five (5) for each of Diamond, Platinum, Gold, Silver, and Bronze SLs). In other examples, the manager 138 can divide the cores into pools using time dependent factors such as accumulated learning of times of predicted high loads. In other examples, the manager 138 can divide the cores into a number of pools based on a customer application or applications being run by one or more of the hosts 14a-n. Accordingly, the manager 138 can dynamically create pools and adjust the size of the pools (i.e., amount of cores allocated to each pool) based on how many applications have been started by the hosts 14a-n, a size of each application, and/or SL associated with each application.

Once the number of pools is determined, the CPU manager 138 assigns each pool with a set of cores. In one example embodiment, the CPU manager 138 can evenly assign the cores amongst the pools. In another example embodiment, the CPU manager 138 assigns each pool to process I/O operations associated with particular SL tiers. Based on the assignment, the CPU manager 138 can determine a potential workload for each pool and assign each pool with a number of cores based on the determined potential workload. To process higher tiered SL I/O operations, the CPU manager 138 can pool CPU cores that include cache and memory objects local to sockets of the CPU cores and on the same board as the CPU cores. Such a grouping avoids inter socket transfers and accesses and can streamline memory access to ensure QoS for higher tiered SL I/O operations.

In embodiments, the CPU manager 138 can balance/rebalance (e.g., reassign) CPU cores between the CPU pools 310a-b based on one or more current and historical I/O workloads (e.g., amount of I/O operations received in an I/O stream) and workload patterns (e.g., amount of I/O operations associated with each SL for any given I/O stream). For example, the CPU manager 138 can use any known or yet to be known machine learning technique to predict I/O workloads and workload patterns.

Based on the current and historical workloads, the CPU manager 138 can use any known or yet to be known machine learning technique to predict stall probabilities and/or stall types associated with each I/O operation received in an I/O stream. For example, the CPU manager 138 can associate lowered tiered I/O operations with higher stall probabilities because such operations are likely to require a memory resource in a lower tier of the storage systems memory hierarchy (e.g., hierarchy 200 of FIG. 2).

Based on one or more of the predicted I/O workload, workload patterns, stall types, and stall probabilities, the CPU manager 138 can transfer CPU cores between the pools 310a-b. In some instances, the prediction may not be correct. Accordingly, the CPU manager 138 can transfer the CPU cores over a period (e.g., allocation period) which can be predetermined or dynamically adjusted based on changes in I/O workloads and workload patterns and their corresponding changes in stall probabilities and stall types. As such, the CPU manager 138 may transfer the CPU cores between the pools 310a-b such that the number of cores in each of the pools 310a-b is not equal. For example, the CPU manager 138 can transfer cores between the pools 310a-n to maintain a threshold level of throughput for any given workload associated with each of the pools 310a-b, which can be based on one or more of the predicted I/O workloads, workload patterns, stall types, and stall probabilities. Accordingly, the CPU manager 138 can implement such intelligent pool rebalancing to maintain, e.g., diamond and upper tier workload service levels.

In an example scenario where there are significant workloads accessing data corresponding to a lower SL tier (e.g., making such data "hot" data), the CPU manager 138 and CPU scheduler 134 can throttle back processing of such workloads and/or re-route those workloads from pool A 310a to pool B 310b. By throttling and re-routing workloads, the CPU manager 138 and CPU scheduler 134 can provide Diamond and other upper tier I/O operations being processing on pool A 310a a higher priority.

In another example scenario, the CPU manager 138 may detect biased execution of workloads and identify a corresponding risk of a stall in pool B 310b. In such a scenario, the CPU manager 138 determines a resulting level of delay or queuing in which I/O operations age and can be assessed as old. Based on the determined level, the manager 138 can balance some I/O operations from pool B 310b to pool A 310a for processing. Accordingly, the CPU manager 138 is able increase throughput of the storage system by avoiding situations in which pool b 310b is very busy, but pool A 310a is not as busy and has resources (e.g., cores) available to process additional I/O operations.

In embodiments, the HA 21 can store a searchable data structure (e.g., an index or table) in memory 136 that associates each CPU pool 310a-b and/or core with real-time information regarding stalls. For example, each CPU pool 310a-b and/or core can be configured to determine whether one or more I/O operations to be processed by each pool 310a-b and/or core may involve a stall. Each CPU pool 310a-b and/or core can make such a determination based on one or more of an SL associated with each I/O operation, a data object associated with each I/O operation, and a location of memory to be accessed to perform the I/O operation. Based on the determination, each CPU pool 310a-b and/or core can update the data structure with information that includes one or more of a stall period and stall type. In response to a stall period ending, each CPU pool 310a-b and/or core can further update the data structure to clear any indication of a stall.

Using the data structure, the CPU manager 138 and/or the CPU scheduler 134 can determine the status of each of the pools 310a-b and/or cores to perform or request pool rebalancing, respectively, and alter I/O scheduling. Such alteration can enable the HA 21 to avoid resource starvation while maintaining SLs for I/O traffic. Additionally, the machine learning technique(s) used by the CPU manager 138 can analyze the data structure over time to determine an effectiveness of any current pool balancing and/or planned pool rebalancing of the CPU pools 310a-b.

Accordingly, the CPU scheduler 134 can schedule and route individual I/O operations to one of the CPU pools 310a-b and/or a specific core of one of the pools 310a-b based on one or more of a current CPU pool configuration, predicted probability of the individual I/O operation encountering a stall, and a predicted cost of the stall.

Figure 4:
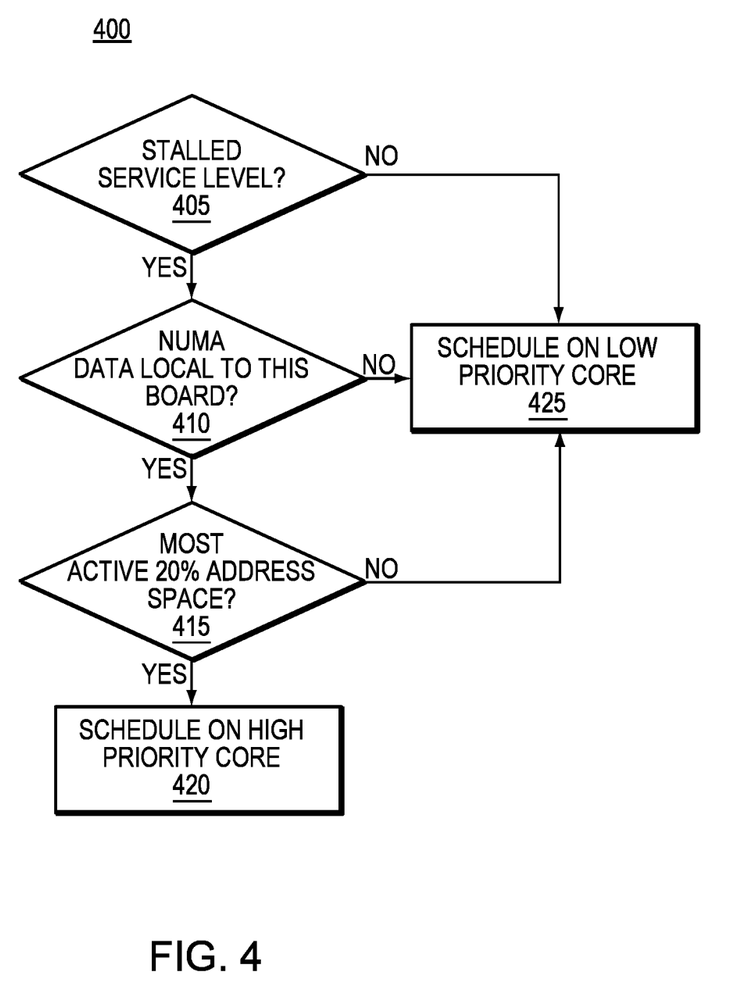
FIG. 4 is a flow diagram of a method for scheduling input/output (I/O) operations between CPU pools in accordance with example embodiments disclosed herein.
Figure 5:
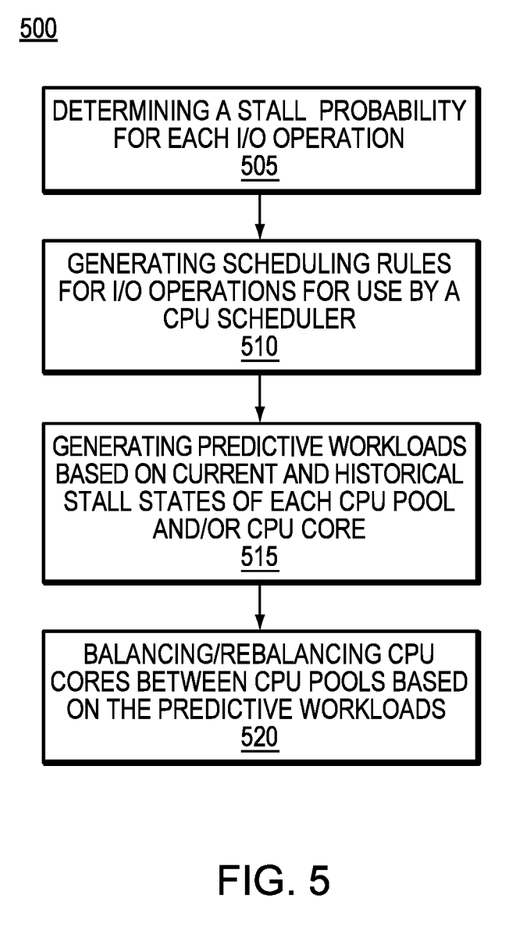
FIG. 5 is a flow diagram of a method for managing CPU pools for I/O scheduling in accordance with example embodiments disclosed herein.
Figure 6:
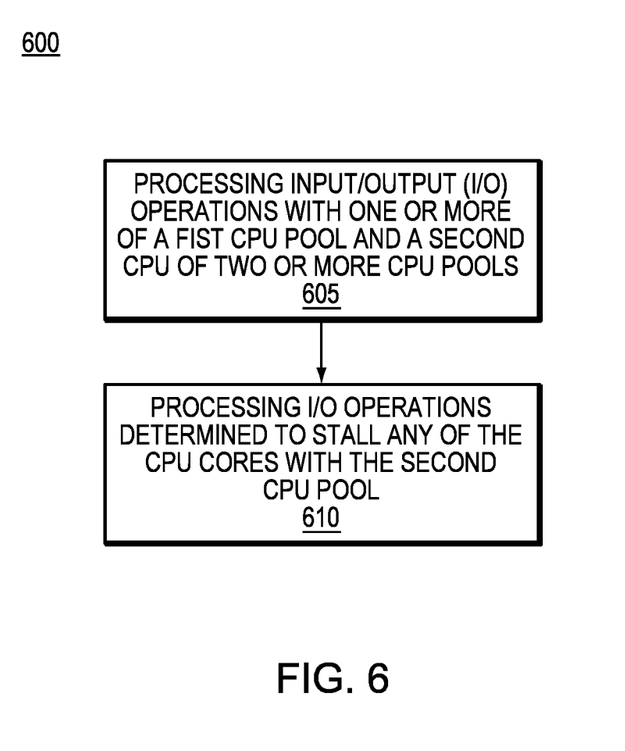
FIG. 6 is a flow diagram of a method for I/O scheduling of CPU pools in accordance with example embodiments disclosed herein.

FIGS. 4-6 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Regarding FIG. 4, a method 400 can be executed by, e.g., the CPU scheduler 134 of FIG. 3. In response to an HA (e.g., the HA 21 of FIG. 2) receiving one or more I/O operations from an I/O stream, the method 400, at 405, for each I/O operation, can include determining if an SL associated with each I/O operation is likely to encounter a stall. If yes, the method 400, at 410, can include determining if each I/O operation relates to non-uniform memory access (NUMA) data local to a board on which a CPU and its cores reside (e.g., CPU 305 of FIG. 3) resides. If yes, the method 400, at 415, can include determining if each I/O operation relates to an active address space (e.g., top 20% of active address spaces). If yes, the method 400, at 420, can include scheduling each I/O operation to be processed in a high priority core. If at any of steps 405, 410, and 415, the answer is no, the method 400, at 425, can include scheduling each I/O operation to be processed on a low priority core. Each of the steps of the method 400 can be performed according to any of the techniques disclosed herein.

Regarding FIG. 5, a method 500 can be executed by, e.g., the CPU manager 138 of FIG. 3. The method 500, at 505, can include determining a stall probability for each I/O operation received from one or more I/O streams. At 510, the method 500 can include generating scheduling rules for I/O operations for use by a CPU scheduler (e.g., scheduler 134 of FIG. 4) to route I/O operations to one of two or more CPU pools of one or more CPUs. The method 500, at 515, can include generating predictive workloads based on current and historical stall states of each CPU pool and/or CPU cores of each pool. At 520, the method 500 can include balancing and/or rebalancing CPU cores between CPI pools based on the predictive workloads. Each of the steps of the method 500 can be performed according to any of the techniques disclosed herein.

Regarding FIG. 6, a method 600 can be executed by, e.g., the HA 21 and/or any of its elements 300 of FIG. 2. In response to the HA receiving one or more I/O operations from an I/O stream, the method 600, at 605, for each I/O operation, can include processing input/output (I/O) operations with one or more of a first CPU pool and a second CPU pool of two or more CPU pools (e.g., pools 310a-b of FIG. 3). The method 600, at 610, can also include processing I/O operations that are determined to stall any of the CPU cores with the second CPU pool. Each of the steps of the method 600 can be performed according to any of the techniques disclosed herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and any combination of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
   establishing a first CPU (central processing unit) pool and a second CPU pool from plurality of CPU cores;
   determining a likelihood associated with each input/output (I/O) operation of an I/O workload causing a processing stall based on a service level (SL) to memory allocation association of each I/O operation and a CPU to memory communication level;
   processing I/O operations that are not predicted to cause processing stalls using the first CPU pool; and
   processing I/O operations predicted to cause processing stalls using the second CPU pool.

2. The method of claim 1 further comprising dividing a plurality of the CPU cores into the two or more CPU pools based on anticipated I/O workloads.

3. The method of claim 1 further comprising determining the I/O operations that stall any of the CPU cores based on a memory allocation associated with each I/O operation.

4. The method of claim 3 further comprising identifying the SL associated with each I/O operation, wherein each SL indicates the memory allocation associated with each I/O operation.

5. The method of claim 3, further comprising assigning each of the first and second CPU pools to process I/O operations based on the SL associated with each I/O operation, wherein SLs associated with a storage memory level indicate a predicted processing stall.

6. The method of claim 3 further comprising:
   processing I/O operations corresponding to a first set of SLs with the first CPU pool; and
   processing I/O operations corresponding to a second set of SLs with the second CPU pool, wherein the second set of SLs are associated with a storage memory level, indicating a predicted processing stall.

7. The method of claim 1 further comprising allocating CPU cores into each of the two or more CPU pools based on one on or more of current and historical I/O workloads.

8. The method of claim 7, wherein allocating the CPU cores into each of the two or more CPU pools occurs over an allocation period.

9. The method of claim 8, wherein the allocation period is dynamically adjusted based on I/O workload patterns.

10. An apparatus configured to:
    establish a first CPU (central processing unit) pool and a second CPU pool from a plurality of CPU cores;
    determine a likelihood associated with each input/output (I/O) operation of an I/O workload causing a processing stall based on a service level (SL) to memory allocation association of each I/O operation and a CPU to memory communication level; and
    process I/O operations that are not predicted to cause processing stalls using the first CPU pool; and
    process I/O operations predicted to cause processing stalls using the second CPU pool.

11. The apparatus of claim 10 further configured to divide a plurality of the CPU cores into two or more CPU pools based on anticipated I/O workloads.

12. The apparatus of claim 10 further configured to determine the I/O operations that stall any of the CPU cores based on a memory allocation associated with each I/O operation.

13. The apparatus of claim 12 further configured to identify the SL associated with each I/O operation, wherein each SL indicates the memory allocation associated with each I/O operation.

14. The apparatus of claim 12, further configured to assign each of the first and second CPU pools to process I/O operations based on the SL associated with each I/O operation, wherein SLs associated with a storage memory level indicate a predicted processing stall.

15. The apparatus of claim 12 further configured to:
    process I/O operations corresponding to a first set of SLs with the first CPU pool; and
    process I/O operations corresponding to a second set of SLs with the second CPU pool, wherein the second set of SLs are associated with a storage memory level, indicating a predicted processing stall.

16. The apparatus of claim 10 further configured to allocate CPU cores into each of the two or more CPU pools based on one on or more of current and historical I/O workloads.

17. The apparatus of claim 16, wherein the allocation of the CPU cores into each of the two or more CPU pools occurs over an allocation period.

18. The apparatus of claim 17, wherein the allocation period is dynamically adjusted based on I/O workload patterns.

* * * * *